Patented Apr. 28, 1942

2,281,415

UNITED STATES PATENT OFFICE 2,281,415

POLYESTER AMIDES

Donald Drake Coffman, Wilmington, Del., assignor to E. I. du Pont de Nemours & Company, Wilmington, Del., a corporation of Delaware No Drawing. Application November 7, 1939, Serial No. 303,318

12 Claims. (Cl. 260—75)

This invention relates to polymeric materials and more particularly to synthetic linear polymers.

The synthetic linear polymers with which this invention is concerned are of the general type described in U. S. Patent 2,071,250. Among the polymers described in this patent are the ester-amide interpolymers obtained by conjoint polymerization of polyamide-forming and polyester-forming reactants. The previously proposed ester-amide interpolymers have properties intermediate between those of the simple polyesters and polyamides. Although they are useful for certain purposes, they do not yield fibers, films and the like having the high qualities of the polyamides. A method subsequently proposed for the production of ester-amide interpolymers of improved utility has been to use such proportions of the reactants that the polymer contains a high ratio of ester groups to amide groups. The present invention is directed to another method for obtaining ester-amide interpolymers having enhanced utility and having certain properties which are not intermediate between those of the simple polyesters and polyamides but which are surprisingly different from either.

This case bears a co-pending relationship to application Serial No. 232,685, now U. S. Patent 2,224,037, filed September 30, 1938, by the present inventor jointly with M. M. Brubaker and R. E. Christ.

This invention has as an object the preparation of new and useful polymers. A further object is the production of tough, highly elastic polymers. A still further object is the preparation of valuable fiber-forming and film-forming polymers. Other objects will appear hereinafter.

These objects are accomplished through the production of an ester-amide interpolymer by reacting together under polymerizing conditions a linear polyamide-forming composition and a linear polyester-forming composition, said polyester-forming composition containing a diprimary glycol having at least one hydrocarbon substituent attached to the chain of atoms separating the hydroxyl groups. More specifically the invention is carried out by heating the reaction mixture at polymerizing temperatures and continuing the heating with the removal of the by-products of the reaction until the product can be drawn into continuous pliable filaments.

The term "linear" as used in the expressions "linear polyamide-forming composition" and "linear polyester-forming composition" signifies that the polymer-forming constituents of said compositions are such as yield linear polymers. This means that the polymer-forming constituents of said compositions are bifunctional reactants.

The polyamide-forming compositions used are those described in U. S. Patents 2,071,253 and 2,130,948. They are of two general types, namely, polymerizable monoaminomonocarboxylic acids and their amide-forming derivatives, and mixtures of diamines with dibasic carboxylic acids or amide forming derivatives thereof.

The polyester-forming compositions used comprise a glycol of the type mentioned above and a dibasic carboxylic acid or an ester-forming derivative thereof. If desired, polymerizable hydroxyacids and other bifunctional polymer-forming reactants can be used in addition to the mentioned polyester-forming compositions.

I have discovered that when ester-amide interpolymers are prepared with the use of a diprimary glycol having a lateral substituent as described above, the products have unusually high stretchability and recovery from stretch. In some cases the elasticity approaches that of rubber. Other desirable properties of the polymers are good solubility and high pliability or softness.

The high elasticity of the products of this invention is shown in the following table which compares two ester-amide interpolymers of comparable composition except that one polymer (A) is prepared with the use of a substituted glycol and the other (B) with the use of an unsubstituted glycol.

TABLE I

Elasticity of completely cold rolled ester-amide interpolymer ribbons

| Polymer | Ester reactants | Amide reactants | Ratio of ester to amide reactants | Extent to which ribbons can be stretched |
|---|---|---|---|---|
| | | | Percent | Percent |
| A | 2,2-dimethyl-propanediol+adipic acid. | Hexamethylene-diamine+adipic acid. | 80 | 125 |
| B | Hexamethylene-glycol+adipic acid. | Hexamethylene-diamine+adipic acid. | 80 | 20 |

The best method for carrying out my invention involves the addition of water to the polymer-forming compositions followed by a brief preliminary heating under atmospheric pressure which serves to effect partial condensation and to remove the water originally introduced. Addition of water at the beginning of the heating cycle eliminates frothing and homogenizes the mixture so that the polyamide- and polyester-forming ingredients will not polymerize independently by the formation of two phases. The condensation is then continued at higher temperature under reduced pressure until the product has a sufficiently high molecular weight to exhibit fiber-forming properties.

The following examples, in which parts are by weight, are illustrative of the preparation and application of the products of this invention.

EXAMPLE I

A mixture of 29 parts of hexamethylenediamine, 513.9 parts of pentaglycol (2,2-dimethylpropanediol), 1048.5 parts of sebacic acid, and 100 parts of water is heated for 4 hours at 150° C./atm., 4 hours at 200° C./atm., 16 hours at 200° C./2 mm., and finally for 20 hours at 250° C./2 mm. Throughout the entire heating period a slow stream of nitrogen is bubbled through the reaction mass to effect agitation and to facilitate the removal of water. The resulting fiber-forming, ester-amide interpolymer is a tough, transparent, rubber-like product. It melts at 85° C. and has an intrinsic viscosity, as defined in U. S. Patent 2,130,948, of 1.12. The polymer is soluble in esters, alcohols, ketones, ethers, aromatic hydrocarbons, and chlorinated hydrocarbons. Films cast from the molten polymer or from solutions thereof can be cold drawn or cold rolled to yield oriented products. The fully drawn or rolled products thus obtained are unusually rubber-like. They can be stretched to six times their length (as compared with eight times for natural rubber), and when the stretching force is removed, the products snap back like rubber. The recovery is instantaneous and substantially complete.

EXAMPLE II

A mixture of 6.97 parts of hexamethylenediamine, 47.84 parts of 2-ethyl-2-butyl-propanediol, 72.51 parts of sebacic acid and 10 parts of water is heated for 8 hours at 150° C./atm., 5 hours at 150° C./20 mm., 8 hours at 200° C./2 mm., and finally 3 days at 250° C./2 mm. A slow stream of nitrogen is bubbled through the mixture to cause agitation and to facilitate the removal of water. The product is a tough, transparent, highly elastic polymer having a melting point of 104° C., an intrinsic viscosity of 0.65, and a melt viscosity of 7,584 poises at 139° C. Oriented films thereof have a tensile strength of 1,935 lbs./sq. in. (4,550 lbs./sq. in. calculated on dimensions at break).

The properties of other polymers prepared from the same reactants in various proportions are given in the following tables. Table II lists the melting point, as determined on a metal block, and the hardness, and Table III the recovery in per cent from stretch of strips of the polymers which have been cold rolled to twice their original length.

TABLE II

*Melting point and hardness of interpolymers*

| Ratio of ester to amide reactants | Melting point | Hardness in grams |
|---|---|---|
| | °C. | |
| 90:10 | 65 | 1 |
| 85:15 | 104 | 3 |
| 80:20 | 122 | 6 |
| 70:30 | 145 | 20 |
| 50:50 | 170 | 40 |

TABLE III

*Recovery from stretch of partially cold rolled strips*

| Ratio of ester to amide reactants | Percent recovery from stretch of— | | |
|---|---|---|---|
| | 20% | 40% | 60% |
| 90:10 | 94 | 94 | 94 |
| 85:15 | 92 | 90 | 88 |
| 80:20 | 90 | 89 | 88 |
| 70:30 | 87 | 87 | 86 |
| 50:50 | 85 | 84 | 80 |

EXAMPLE III

A mixture of 19.35 parts of hexamethylenediamine, 20.97 parts of 2,2-diethyl-propanediol, 65.77 parts of sebacic acid, and 10 parts of water is heated for 4 hours at 150° C./atm., 4 hours at 150° C./20 mm., 30 hours at 200° C./2 mm., and finally for 2 days at 250° C./2 mm. The product obtained is a clear, transparent, tough polymer melting at 171° C., and having a hardness of 45 g. and an intrinsic viscosity of 0.97. Melt cast sheets could be cold rolled into films having a tensile strength of 12,730 lbs./sq. in. based on the original dimensions (21,180 lbs./sq. in. based on dimensions at break). Films which have been cold rolled to twice their original length have a recovery from a 60% stretch of 78%.

EXAMPLE IV

A mixture of 13.77 parts of decamethylenediamine, 23.75 parts of pentaglycol, 62.29 parts of sebacic acid, and 0.10 part of phosphoric acid (catalyst) is heated for 4 hours at 150° C./atm., 4 hours at 200° C./atm., and finally for 36 hours at 250° C./2 mm. The product is a clear, tough polymer melting at 137° C. and having an intrinsic viscosity of 0.95, a hardness of 24 g., and a melt viscosity of 5,000 poises at 176° C. Oriented films thereof have a tensile strength of 4,440 lbs./sq. in. based on the original dimension (6,160 lbs./sq. in. at break). Films which have been cold rolled to twice their original length have a recovery of 87% from a 60% stretch.

EXAMPLE V

A mixture of 31.46 parts of hexamethylenediammonium adipate, 34.88 parts of 2,2-diethyl-propanediol, 38.54 parts of adipic acid, and 10 parts of water is heated for 4 hours at 150° C./atm., 4 hours at 200° C./atm., and finally for 5 days at 200° C./2 mm. The product thus obtained is an amber-colored, tough, rubbery polymer melting at 122° C. and having an intrinsic viscosity of 0.57 and a melt viscosity of 509 poises at 176° C. Oriented films have a tensile strength of 2,060 lbs./sq. in. based on the original dimensions (3,360 lbs./sq. in. at break). Films of the interpolymer which have been cold rolled to twice their original length have an elastic recovery of 84% from a 20% stretch, 80% from a 40% stretch, and 78% from a 60% stretch.

EXAMPLE VI

A mixture of 31.42 parts of hexamethylenediammonium adipate, 38.40 parts of 2-ethyl-2-butyl-propanediol, 35.02 parts of adipic acid, and 10 parts of water is heated for 8 hours at 150° C./atm., and finally for 4 days at 200° C./2 mm. The product is a clear, tough, elastic polymer which melts at 120° C. and has an intrinsic viscosity of 0.63 and a melt viscosity of 2,844 poises at 176° C. Oriented films thereof have a tensile strength of 3,420 lbs./sq. in. based on the original dimensions (6,500 lbs./sq. in at break). This interpolymer when cold drawn to twice its original length has an elastic recovery of 90% from a 20% stretch, 87% from a 40% stretch, and 85% from a 60% stretch.

EXAMPLE VII

A mixture of 6.97 parts of hexamethylenediamine, 17.62 parts of 3-methylhexamethylene glycol, 39.02 parts of sebacic acid, and 10 parts of water is heated for 4 hours at 176° C./atm., 18 hours at 200° C./2 mm., and finally for 3 days at 250° C./2 mm. The product thus obtained is a tough, elastic polymer which melts at 145° C. and has an intrinsic viscosity of 0.67 and a melt viscosity of 456 poises at 176° C. Oriented films have a tensile strength of 3,310 lbs./sq. in. based on the original dimensions (5,060 lbs./sq. in at break). Films of the interpolymer which have been cold drawn to twice their original length have an elastic recovery of 84% from a 20% stretch.

EXAMPLE VIII

A mixture of 7.74 parts of hexamethylenediamine, 40.11 parts of phenyldiethanolamine, 58.23 parts of sebacic acid, and 10 parts of water is heated for 4 hours at 170° C./atm., and finally for 2 days at 250° C./2 mm. The product is a tough, elastic polymer which melts at 116° C., and has an intrinsic viscosity of 0.40. Oriented films have a tensile strength of 3,200 lbs./sq. in. based on the original dimensions (4,960 lbs./sq. in. at break). Films of this interpolymer which have been cold rolled to twice their original length have an elastic recovery of 94% from a 20% stretch.

EXAMPLE IX

A mixture of 25.00 parts of ε-aminocaproic acid, 8.49 parts of pentaglycol, and 16.51 parts of sebacic acid is heated for 4 hours at 176° C./atm., 8 hours at 176° C./2 mm., and finally for 72 hours at 200° C./2 mm. A slow stream of nitrogen is bubbled through the mixture to cause agitation and to facilitate in the removal of water. The product is a tough, transparent, elastic polymer having a melting point of 101° C., an intrinsic viscosity of 0.70, and a melt viscosity of 12,560 poises at 139° C. Oriented films thereof have a tensile strength of 5,100 lbs./sq. in. based on the original dimensions (6,250 lbs./sq. in. calculated on the dimensions at break). Films of the interpolymer which have been cold rolled to twice their original length have an elastic recovery of 92% from a 20% stretch.

The laterally substituted glycols which are preferred in the practice of this invention are those of the formula

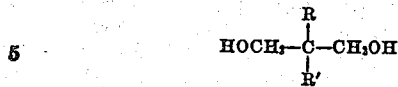

where R and R' represent monovalent hydrocarbon radicals which may be the same or different. Examples of glycols which fall within this group are 2,2 - dimethyl - propanediol, 2,2-diethyl-propanediol and 2 - ethyl - 2 - butyl - propanediol. Other suitable glycols are those of the formula

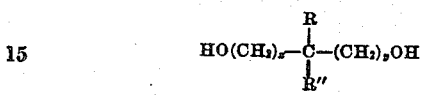

where R is a hydrocarbon radical and R'' is hydrogen or a monovalent hydrocarbon radical and where $x$ and $y$ may be one or greater. A typical example is 3-methylhexamethylene glycol. A further type of glycol is one of the formula

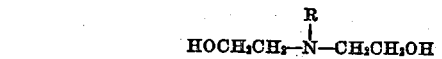

wherein R is defined as above, which contains a lateral substituent on a heteroatom, for example N-phenyldiethanolamine. The chain separating the hydroxyls in the substituted diprimary glycols used in this invention may contain atoms other than carbon, e. g., N, S, or O.

The diamines and dibasic acids and amino acids are those useful in making the polyamides described in the previously mentioned patents. The most suitable diamines are of formula $NH_2RNH_2$, where R represents a saturated divalent hydrocarbon radical with a chain length of at least two carbon atoms. As examples of diamines which fall within this group might be mentioned ethylenediamine, hexamethylenediamine, 3-methylhexamethylenediamine, and decamethylenediamine. However, aromatic diamines such as m-phenylenediamine may also be used. Diamines containing a heteroatom, such as 3,3'-diamino-dipropyl ether, may also be used. The preferred dibasic carboxylic acids are of formula HOOC—R'—COOH, where R' represents a saturated divalent hydrocarbon radical with a chain length of at least four carbon atoms. Examples of these acids are adipic, β-methyladipic, azelaic and sebacic acids. Examples of other useful dibasic carboxylic acids are carbonic, glutaric, diglycolic, phenylenediacetic, and diphenic acids.

It is to be understood that the amide-forming and/or ester-forming derivatives are intended to be included by the mention herein of diamines, dibasic carboxylic acids, glycols, and amino acids. In the case of the amino acids the amide-forming derivatives include the lactams.

On hydrolysis with strong mineral acids the interpolymers of this invention yield the glycol from which they are derived and polyamide-forming reactants. Thus, an interpolymer derived from a diamine, a dibasic carboxylic acid, and a substituted glycol will yield, on hydrolysis with hydrochloric acid, the glycol, the dibasic carboxylic acid, and the diamine hydrochloride. Similarly, an interpolymer derived from an amino acid, a dibasic carboxylic acid, and a substituted glycol will yield, on hydrolysis with hydrochloric acid, the glycol, the dibasic carboxylic acid, and the amino acid in the form of its hydrochloride.

As in the case of other fiber-forming synthetic linear condensation polymers, the interpolymers of this invention can be cold drawn or cold rolled. The products thus obtained are oriented in the direction in which the drawing or rolling is applied. Thus cold drawn fibers of the interpolymer show by characteristic X-ray patterns orientation along the fiber axis. The interpolymers of this invention do not acquire the desired high strength and toughness unless they have been polymerized to the extent that they can be formed into fibers. In general the interpolymers do not acquire fiber-forming properties until they have an intrinsic viscosity of at least 0.4. The most desirable products have intrinsic viscosities above 0.6.

In general the interpolymers which are high in ester content are soluble in a large variety of solvents such as alcohols, esters, and ketones, whereas those low in ester content are soluble only in the usual polyamide solvents such as phenol and formic acid. The melting points range gradually from that of the pure polyester to that of the pure polyamide. As shown in the foregoing tables, the elasticity of the interpolymers increases as the ester content is increased so that compositions containing between 90–95% ester closely simulate rubber. Fully cold drawn or rolled products can in many cases be drawn to six times their original length and recover immediately and almost completely when the stretching force is released. These products have a snap similar to that of rubber.

The more rubber-like ester-amide interpolymers are adaptable to processing on a two-roll mill or on a calender by a technique essentially the same as that used with rubber compositions. Pigments, stabilizers, and other modifying agents can be dispersed in the polymer by mill mixing operations, and the resulting compositions can be successfully subjected to sheeting or tubing operations. Mill mixing is of particular advantage in dispersing insoluble materials. Since these polymers can generally be milled at temperatures of from 10 to 40° C. below their melting points, the process is also of advantage for dispersing or dissolving unstable materials or compounds which would react with the polymers at higher temperatures. The high viscosities of the polymers at temperatures below their melting points result in a shearing action on agglomerates during milling which aids the process of dispersion. By means of pigmentation, the nerve, surface pattern, toughness, apparent melting point, working properties, and color of the milled or calendered sheets can be controlled to advantage. Among the pigments which were found to increase the durability and physical behavior of these polymers are phthalocyanine blue, red iron oxide, and channel black.

The ester-amide interpolymers may also be mixed with other polymeric materials, such as rubber, or with each other on the mill. In carrying out such an operation, the two or more polymers to be mixed are first milled separately under such conditions (i. e., temperature) that they are reduced to approximately the same plasticity before combining on the mill.

The products of this invention, due to their unusual elasticity, toughness and pliability, are useful not only in the manufacture of improved fibers, e. g., for use in making fabrics of high elasticity such as foundation garments, but are also valuable in the production of safety-glass interlayers, wrapping film, and the like. By reason of the fact that cold drawn filaments of the interpolymers tend to retract when heated to temperatures somewhat below their melting points, they are useful in making felted articles. For this use staple fibers of the interpolymers are heated in admixture with other fibers, e. g., cotton. The good solubility characteristics of the interpolymers make them useful as ingredients in coating and impregnating compositions for wood, cloth, leather, paper, etc. The products are also useful in molding compositions and for preparing tubing. Where desirable, the present interpolymers when applied to any of the above uses may be admixed with other materials such as plasticizers, pigments, dyes, resins, and cellulose materials. The most useful interpolymers for most applications are those prepared from polymer-forming compositions containing from 50 to 95% of polyester-forming reactants.

As many apparently widely different embodiments of this invention may be made without departing from the spirit and scope thereof, it is to be understood that I do not limit myself to the specific embodiments thereof except as defined in the appended claims.

I claim:

1. A polymeric reaction product of a linear polyamide-forming composition comprising a member of the class consisting of polymerizable monoaminomonocarboxylic acids and mixtures of diamine and dibasic carboxylic acid and a linear polyester-forming composition which comprises a diprimary glycol having at least one hydrocarbon substituent attached to the chain of atoms separating the hydroxyl groups; the said polymeric reaction product being one which can be formed into fibers showing by characteristic X-ray patterns orientation along the fiber axis.

2. A polymer capable of being formed into fibers showing by X-ray patterns orientation along the fiber axis, said polymer being the reaction product of a linear polyamide-forming composition comprising a polymerizable monoaminomonocarboxylic acid and a linear polyester-forming composition which comprises a diprimary glycol having at least one hydrocarbon substituent attached to the chain of atoms separating the hydroxyl groups.

3. A polymer capable of being formed into fibers showing by X-ray patterns orientation along the fiber axis, said polymer being the reaction product of a linear polyamide-forming composition comprising a diamine and a dibasic carboxylic acid and a linear polyester-forming composition which comprises a diprimary glycol having at least one hydrocarbon substituent attached to the chain of atoms separating the hydroxyl groups.

4. The polymeric product set forth in claim 1 in which said glycol is of the formula

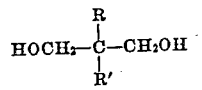

where R and R′ are monovalent hydrocarbon radicals.

5. The polymeric product set forth in claim 1 in which said glycol is of the formula

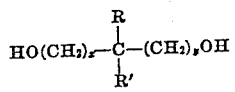

where $x$ and $y$ are integers of at least one, R is a monovalent hydrocarbon radical, and R′ is a member of the class consisting of hydrogen and monovalent hydrocarbon radicals.

6. The polymeric product set forth in claim 1 in which said glycol is of the formula

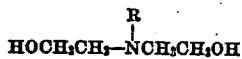

where R is a monovalent hydrocarbon radical.

7. The polymer set forth in claim 1 in which said glycol is 2,2'-dimethyl-propanediol.

8. A process for making fiber-forming polymers which comprises heating at polymerizing temperatures a linear polyamide-forming composition comprising a member of the class consisting of polymerizable monoaminomonocarboxylic acids and mixtures of diamine and dibasic carboxylic acid and a linear polyester-forming composition, which comprises a diprimary glycol having at least one hydrocarbon substituent attached to the chain of atoms separating the hydroxyl groups, and continuing the heating until the product can be drawn into continuous pliable filaments.

9. The process set forth in claim 8 in which said polyamide-forming composition comprises a polymerizable monoaminomonocarboxylic acid.

10. The process set forth in claim 8 in which said polyamide-forming composition comprises a diamine and a dibasic carboxylic acid.

11. A process for making fiber-forming polymers which comprises preliminarily heating a mixture of water, diamine, dibasic carboxylic acid and a diprimary glycol having at least one hydrocarbon substituent attached to the chain of atoms separating the hydroxyl groups, and continuing the heating, after removal of water, at polymerizing temperature and reduced pressure until the product can be drawn into continuous, pliable filaments.

12. The polymeric reaction product set forth in claim 1 wherein the said linear polyamide-forming combposition contains 50–95% of polyester-forming reactants.

DONALD DRAKE COFFMAN.